United States Patent [19]

Yamaguchi et al.

[11] Patent Number: 4,827,530

[45] Date of Patent: May 2, 1989

[54] METHOD AND APPARATUS FOR KOREAN CHARACTER RECOGNITION FROM KOREAN ALPHABET ROW

[75] Inventors: Michio Yamaguchi; Junji Shinoda, both of Tokyo, Japan

[73] Assignee: Oki Electric Industry Co., Ltd., Tokyo, Japan

[21] Appl. No.: 932,571

[22] Filed: Nov. 20, 1986

Related U.S. Application Data

[63] Continuation-in-part of Ser. No. 756,804, Jul. 16, 1985, abandoned.

[30] Foreign Application Priority Data

Jul. 17, 1984 [JP] Japan ................................ 59-146996

[51] Int. Cl.[4] .............................................. G06K 9/00
[52] U.S. Cl. ........................................ 382/13; 382/56
[58] Field of Search ............................ 382/13, 19, 56; 400/104, 110

[56] References Cited

U.S. PATENT DOCUMENTS

3,852,720  12/1974  Park ...................................... 382/56
4,516,262  5/1985   Sakurai .................................. 382/18

Primary Examiner—E. A. Goldberg
Assistant Examiner—Lincoln Donovan
Attorney, Agent, or Firm—Wenderoth, Lind & Ponack

[57] ABSTRACT

A method and apparatus for recognizing a Korean character to be assembled from an inputted Korean alphabet row and an apparatus therefor includes, in the method the steps of judging whether an inputted Korean alphabet row is monoconsonants or double consonants among consonants and judging whether it is horizontal vowels or vertical vowels among vowels, and assembling a Korean character on the basis of a judgement as to whether any combination of monoconsonants is possible or any combination of horizontal vowels and vertical vowels is possible and a judgement as to whether any double consonant can be arranged as the final consonant in conformity with the assembled status of the Korean alphabet row previously inputted. Moreover, the apparatus performs all of the above judgement processing and of processings following the respective judgement processings, and processes the above recognition processing by making use of a hardware interrupt and software interrupt for each key input of the individual Korean alphabet rows.

2 Claims, 6 Drawing Sheets

| CLASSIFICATION | | KOREAN ALPHABET |
|---|---|---|
| VOWEL | HORIZONTAL VOWEL | ㅗ ㅛ ㅜ ㅠ ㅡ |
| | VERTICAL VOWEL | ㅏ ㅑ ㅓ ㅕ ㅣ ㅐ ㅒ ㅔ ㅖ |
| CONSONANT | MONO-CONSONANT | ㄱ ㄴ ㄷ ㄹ ㅁ ㅂ ㅅ ㅇ ㅈ ㅊ ㅋ ㅌ ㅍ ㅎ |
| | DOUBLE CONSONANT | ㄲ ㄸ ㅃ ㅆ ㅉ |

Fig. 3

| TYPES OF INPUT / STATUS | CONSONANT | | VOWEL | | OTHER THAN KOREAN ALPHABETS |
|---|---|---|---|---|---|
| | MONO-CONSONANT | DOUBLE CONSONANT | HORIZONTAL VOWEL | VERTICAL VOWEL | |
| 0 INITIAL STATUS | →① (00) | →① (00) | →⓪ (01) | →⓪ (01) | →⓪ (03) |
| 1 VOWEL WAITING STATUS | →⓪ (01) | →⓪ (01) | ◇④ ②(00) ③(00) | →③ (00) | →⓪ (01) |
| 2 VERTICAL VOWEL WAITING STATUS | ◇①④(00) ⑤(00) | ◇②①(02) ⑤(00) | →⓪ (01) | ◇⑤ ⓪(01) ③(00) | →⓪ (04) |
| 3 CONSONANT WAITING STATUS | ◇①④(00) ⑤(00) | ◇②①(02) ⑤(00) | →⓪ (01) | →⓪ (01) | →⓪ (04) |
| 4 MONOCONSONANT WAITING STATUS | ◇③①(02) ⑤(00) | →① (02) | ◇④ ②(02) ③(02) | →③ (02) | →⓪ (04) |
| 5 HEAD CONSONANT WAITING STATUS | →① (02) | →① (02) | ◇④ ②(02) ③(02) | →③ (02) | →⓪ (04) |

REM.) →○ : ILLUSTRATE STATUS TRANSITION ( ) : DESIGNATE PROCESSING NUMBER

◇ : ILLUSTRATE COMBINATION NUMBER

| AFTER / BEFORE | ㅁ | ㅊ | ㅇ | ㄷ | ㄹ | ㅎ | ㅂ | ㄱ | ㄴ | ㅅ | ㅍ | ㅈ | ㅌ | ㅋ |
|---|---|---|---|---|---|---|---|---|---|---|---|---|---|---|
| ㅁ | | | | | | | | | | | | | | |
| ㅊ | | | | | | | | | | | | | | |
| ㅇ | | | | | | | | | | | | | | |
| ㄷ | | | | | | | | | | | | | | |
| ㄹ | ㄻ | | | | | ㅀ | ㄼ | ㄺ | | ㄽ | ㄿ | | ㄾ | |
| ㅎ | | | | | | | | | | | | | | |
| ㅂ | | | | | | | | | | ㅄ | | | | |
| ㄱ | | | | | | | | | | ㄳ | | | | |
| ㄴ | | | | | ㄶ | | | | | | | ㄵ | | |
| ㅅ | | | | | | | | | | | | | | |
| ㅍ | | | | | | | | | | | | | | |
| ㅈ | | | | | | | | | | | | | | |
| ㅌ | | | | | | | | | | | | | | |
| ㅋ | | | | | | | | | | | | | | |

REM.) ILLUSTRATE CHARACTERS AFTER COMBINING SYMBOLS CAPABLE OF COMBINATION

Fig. 6

| VERTICAL VOWEL / HORIZONTAL VOWEL | ㅠ | ㅋ | ㅑ | ㅓ | ㅏ | ㅣ | ㅐ | ㅔ | ㅕ |
|---|---|---|---|---|---|---|---|---|---|
| ㅠ |   |   |   |   |   |   |   |   |   |
| ㅗ |   |   |   |   | ㅘ | ㅚ | ㅙ |   |   |
| ㅡ |   |   |   |   |   | ㅢ |   |   |   |
| ㅜ |   |   |   | ㅝ |   | ㅟ |   | ㅞ |   |
| ㅛ |   |   |   |   |   |   |   |   |   |

REM.) ILLUSTRATE CHARACTERS AFTER COMBINING SYMBOLS CAPABLE OF COMBINATION

Fig. 7

| DOWEL CONSONANT | ㅃ | ㅉ | ㄸ | ㅆ | ㄲ |
|---|---|---|---|---|---|
| MONOCONSONANT YES OR NO AS THE LAST CONSONANT | X | X | X | O | O |

1

METHOD AND APPARATUS FOR KOREAN CHARACTER RECOGNITION FROM KOREAN ALPHABET ROW

This application is a continuation in part of now abandoned U.S. patent application Ser. No. 756,804, filed on July 16, 1985.

BACKGROUND OF THE INVENTION

The present invention relates to a method and an apparatus for recognizing a Korean (Hangul) character to be assembled from a Korean alphabet row inputted into the apparatus, and more particularly to a method and an apparatus for receiving, in a system using a microprocessor, a Korean alphabet input by using interrupt processing while permitting the microprocessor to execute other jobs, and for thereby recognizing a Korean character to be assembled.

In recent years, banking terminals and word processing units have been developed as being applicable to Korean characters. Such an apparatus employs in general one or more microprocessors, and such a microprocessor executes some jobs such as the control of input/output equipment, prescribed logical operations and the like in a time sharing manner. Accordingly, the development of a method of recognizing a Korean character and an apparatus therefor has been needed so as to improve the throughput of such a microprocessor.

Japanese Patent Publication No. 59-2030 for example, discloses a method of generating a Korean Character pattern as a prior art method of recognizing a Korean character assembled using a Korean alphabet row. This method recognizes a Korean character by dividing the Korean alphabet row into vowels and consonants and detecting a vowel next to a consonant.

It is assumed in the above method that a Korean alphabet row such as 한ㄱ-ㄹ
is inputted in succession. Here, the alphabet characters "ㅎ", "ㄴ", "ㄱ", "ㄹ", and "ㅏ", "ㅡ" are vowels. Thereupon, these vowels are discriminated one by one, and when a vowel "ㅡ" is inputted, the preceding Korean symbol "한" can be recognized by regarding the symbol "ㄱ" as the initial consonant.

However, in the prior art method, the final consonant yielded by combining "ㄴ" with "ㄱ" is ungrammatical, and hence although the Korean character "한" can be recognized theoretically when "ㄱ" is inputted, in practice this character can not be recognized until the next vowel "ㅡ" is inputted. Thus, the method is defective because the timing to output these Korean symbols to an output device such as a display unit, etc., is delayed.

Moreover, a method to assemble a printing font of Korean characters from prior Korean symbols is known in U.S. Pat. No. 3,852,720 by Park.

According to this method, a proper printing font can be selected from a Korean alphabet row successively inputted by classifying the twenty-four basic Korean symbols being inputted in conformity with a grammatical rule and positional information of the symbols in the printing font.

Park's method however, suffers from a drawback in that it must employ many shift registers, and hence sequential processing is needed to unadvantageously allow a control logic circuit to use a wasteful waiting time. In addition, it must insert a space for punctuating characters. Furthermore, since a character being inputted is limited to the basic twenty-four types, a font table indicative of the configuration of the printing font as well as logic to analyze grammar are complicated.

SUMMARY OF THE INVENTION

In view of the drawbacks of the prior methods, it is an object of the present invention to provide a method of recognizing any Korean character and an apparatus therefor using a microprocessor, the method being capable of improving the throughput of the microprocessor. To achieve the above object, the recognition method of the present invention must be incorporated into the software with ease and must be compact.

Accordingly, the present method is adapted to divide any Korean alphabet into four types: monoconsonants, double consonants, horizontal vowels, and vertical vowels, and is furthermore adapted to permit the microprocessor to cause an interrupt controller to produce a hardware interrupt every time a key for a Korean alphabet is depressed sequentially for discriminating the types of Korean alphabet character so inputted.

Thereupon, the microprocessor accumulates the inputted Korean alphabet characters in a stack and stores the assembled status thereof at a prescribed location in a memory. Moreover, the microprocessor recognizes, for each Korean alphabet characters inputted anew, the type thereof and the assembled status of the previously inputted alphabet character, and investigates the relationship between the Korean alphabet characters inputted at present and before to judge whether or not any combination of consonants is present, and whether or not any combination of horizontal vowels and vertical vowels is present, and whether or not any double consonant can be placed as the final consonant for thereby assembling the Korean symbols assembled in the stack for a Korean character.

DESCRIPTION OF THE PREFERRED EMBODIMENT

Figure 1:
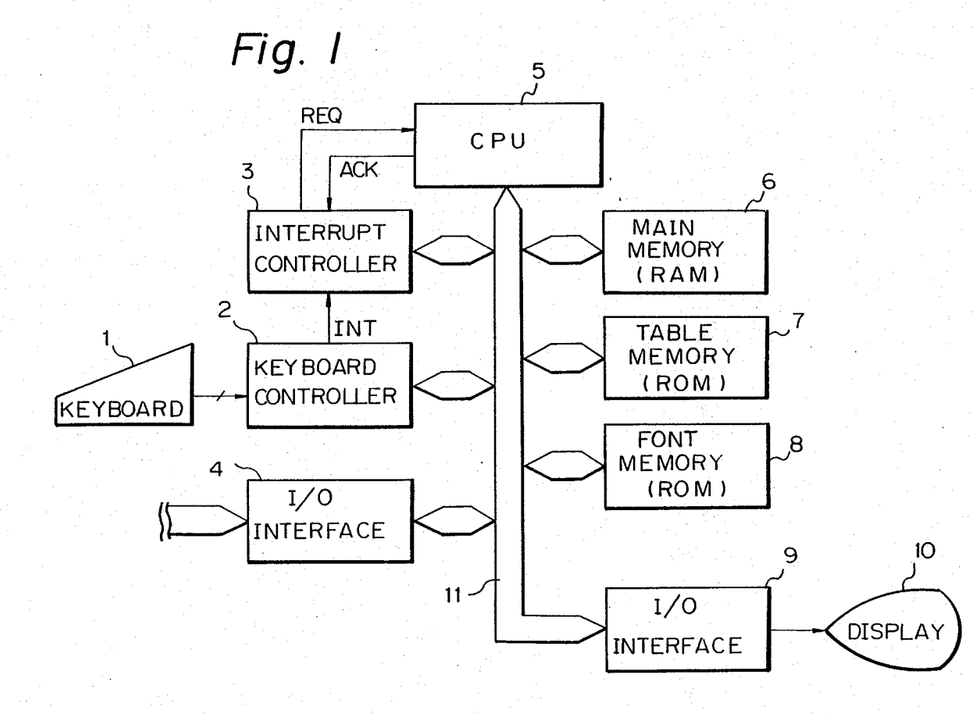
FIG. 1 is a block diagram illustrating a system using a microprocessor to which the present invention is applied.

FIG. 1 is a block diagram illustrating a system to which the Korean character recognition method of the present invention is applied. This system partly represents, for example a banking terminal or a word processor described previously.

This system has a microprocessor 5 (hereinafter referred to as a CPU 5) such as, for example, Part No. i8086 available from US Intel Co., Ltd. as a control unit, including peripheral circuits and equipment to be controlled thereby connected therewith via a bus 11.

As shown in the figure, designated at 1 is a keyboard through which the Korean alphabet characters and alphanumeric codes are inputted element, 2 is a keyboard controller such as for example Intel Part No. i8279 for monitoring and controlling the keyboard element, 3 is an interrupt controller such as Intel Part No. i8259A for interrupting and controlling the CPU 5, 4 is an interface such as Intel i8251 for connecting other equipment (not shown) with the bus 11; element 6 is a main memory (RAM) for storing a program to be executed by the CPU 5, 7 is a table memory (ROM) for storing the combination of Korean alphabet elements described later; element 8 is a font memory (ROM) for storing printing fonts; element 9 is an input/output interface for outputting an assembled Korean character, and element 10 is a CRT display.

First, the basic operation of the system will be described. The CPU 5 executes the control for the units to be controlled (not shown) and logical operations in time sharing manner, and starts to recognize any Korean letter with interruption by the hardware.

When an operator depresses a key on the keyboard 1, the keyuboard controller 2 issues an INT signal, that is, an interrupt signal, to the controller 3. The interrupt controller 3, upon receiving the INT signal, issues an interrupt request signal, a REQ signal, to the CPU 5. The CPU 5 stops the processing at a proper break point of the executed processing in a time sharing manner, and acknowledges an interrupt enable signal, an ACK signal, to the interrupt controller 3. The interrupt controller 3 sets a prescribed interrupt vector to the CPU 5 and transfers the operation to the CPU 5. The CPU 5 starts to execute the processing on the main memory 6 indicated by the interrupt vector.

Figure 3:
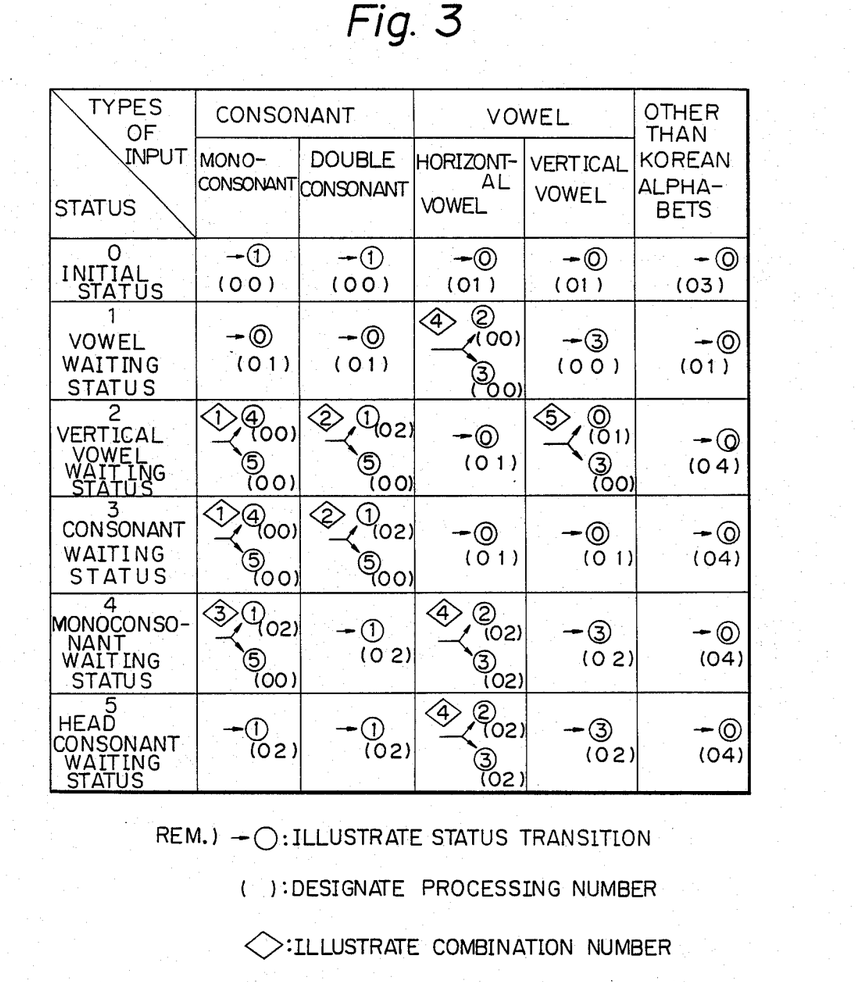
FIG. 3 is a view of status transition illustrating the method of the present invention.

The CPU 5 executing the procesisng on the main memory 6 reads the key depressed previously from a buffer of the keyboard controller 2 and executes a discrimination process in conformity with the status transition table (table 2) of FIG. 3. Moreover, the CPU 5 determines a character code produced as the result, generates a font pattern corresponding to the character code using the font memory 8, and provides it to the display 10 via the I/O interface 9.

In succession, the algorithm to assemble a Korean character will be described in accordance with the detailed operation of the system.

First, korean characters are divided into the initial consonants, vowels, and the final consonants in terms of syllables, and keys on the keyboard 1 are assigned to the initial consonants a one-to-one correspondence. In addition, the vowels are divided into horizontal and vertical vowels to assign them to keys. For the final consonants the same assignment as that for the initial consonants is employed.

Provided that the Korean characters are divided in such a manner, it is sufficient for the purpose of inputting the Korean alphabet, because vowels and the final consonants may often inputted by means of double touches (for example, depressing a control key and keys of two types simultaneously or successively), and the final consonant may not be existent depending on the characters.

Figure 2:
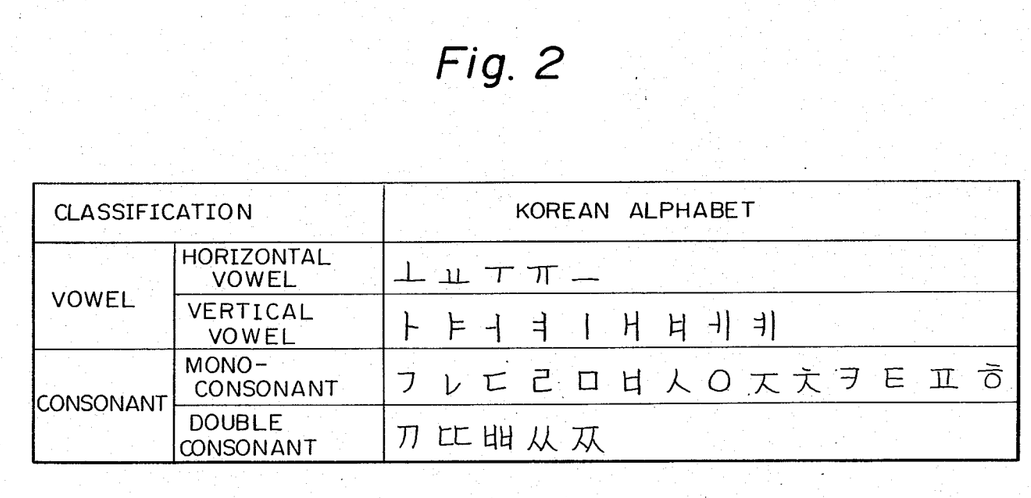
FIG. 2 is a table (table 1) wherein a Korean character is divided in terms of syllables, and vowels are divided into horizontal and vertical vowels while consonants are divided into monoconsonants and double consonants.

In succession, FIG. 2 (table 1) shows the Korean alphabet classified into horizontal vowels, vertical vowels, monoconsonants, and double consonants. Such a classification of the Korean alphabet as shown in the same figure simplifies the method of assembling a Korean character from the Korean alphabet, as summarized by a procedure put in order in FIG. 3 (table 2) as status transition diagrams.

The table 2 shows on the abscissa, types of data read from the buffer of the keyboard 1 while showing on the ordinate, "status" indicative of the present assembled statuses of the Korean alphabet. Each status is composed of six types of changes to another status for each input. Namely, 0 denotes an initial status having no character data inputted, 1 denotes a status of waiting for any vowel, 2 denotes a status of waiting for any vertical vowel, 3 denotes a status of waiting for any consonant, 4 denotes a status of waiting for any monoconsonant, and 5 denotes a status of waiting for any initial consonant.

When there is an input for any status on the ordinate in FIG. 3, the CPU 5 executes a judgement processing shown by the numeral in the symbol ◇ of FIG. 3 in conformity with the type of input, and executes an interrupt processing shown by the numeral in the symbol ( ), and furthermore changes "the status" to a status shown by the numeral in the symbol ◯.

The judgement and interrupt processings described above are listed below:

JUDGEMENT PROCESSINGS

◇1: This judges, when a monoconsonant is inputted and the status is 2 or 3, whether or not any monoconsonant exists which is capable of combination with the monoconsonant so inputted in association with the monoconsonant combination table (table 3) of FIG. 5. If such a monoconsonant exists, the status after the processing is ( ) is finished is set to 4, and if otherwise, the status is set to 5.

Figure 7:
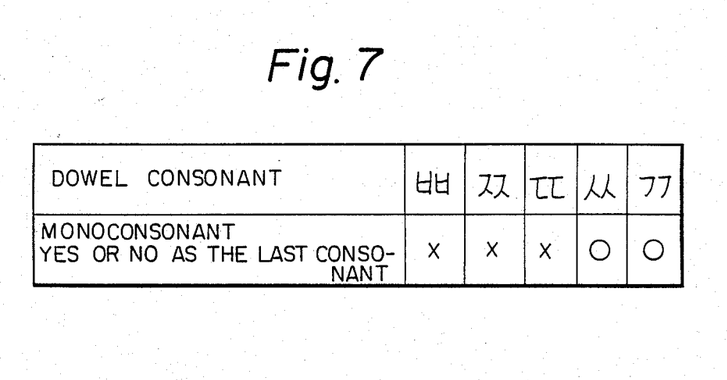
FIG. 7 is a double consonant attribute table (table 4) showing whether or not any double consonant can be placed as the final consonant.

◇2: This judges, when a double consonant is inputted and "the status" is 2 or 3, whether or not the double consonant so inputted can be placed as the final consonant in conformity with the double consonant attribute table of FIG. 7. If it is possible, the status after the processing in ( ) is finished is set to 5, and if otherwise, the status is set to 1.

◇3: This judges, when a monoconsonant is inputted and the status is 4, whether or not the monoconsonant so inputted can be combined with the alphabet element (monoconsonant) previously inputted in accordance with the monoconsonant combination table (table 3) of FIG. 5. If it is possible the status after the processing in ( ) is finished is set to 5, and if otherwise, the status is set to 1.

Figure 6:
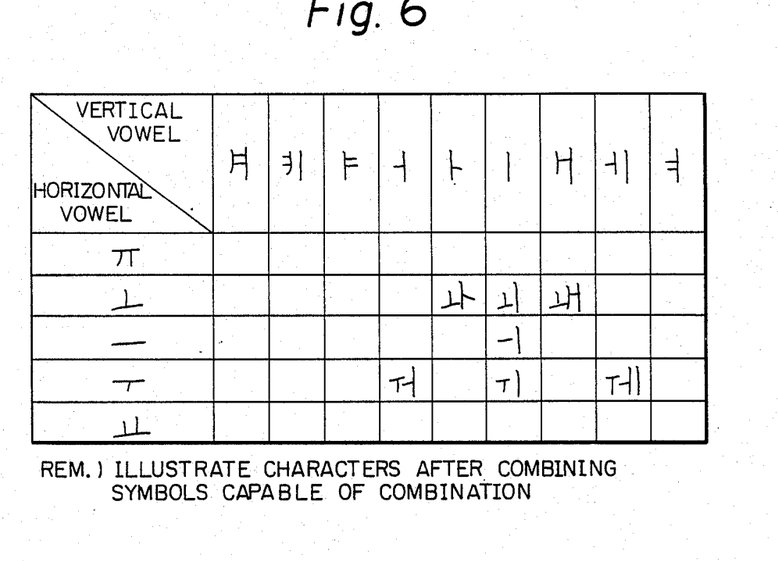
FIG. 6 is a vowel combination table (table 3) specifying the possible combination of vowels.

◇4: This judges, when a horizontal vowel is inputted and the status is 1 or 4 or 5, whether or not any vertical vowel exists which is capable of combination with the alphabet element so inputted in accordance with the vowel combination table (table 4) of FIG. 6. If so, the status after the processing in ( ) is finished is set to 2, and if otherwise, the status is set to 3.

◇5: This judges, when a vertical vowel is inputted and "the status" is 2, whether or not the vowel can be combined with the horizontal vowel previously inputted in accordance with the vowel combination table (table 4) of FIG. 6. If it is possible, the status is set to 3, and if otherwise, the status is set to 0.

(Interrupt Processings):

The processings shown below are those started by interruption onto the software of the CPU 5.

(00): This stores inputted Korean alphabet characters in a stack. (The stack in the present embodiment denotes a particular area on the main memory 6 for storing the inputted Korean alphabet characters for combining them with Korean characters.)

(01): This eliminates all the Korean alphabet characters stored in the stack.

(02): This outputs alphabet characters needed for preparing a recognized Korean character from the Korean alphabet characters stored in the stack and combines the outputted alphabet characters so taken out with the Korean character to read a corresponding font from the font memory 8, provides the font read as such to the display 10 via the I/O interface 9, and stores the Korean alphabet characters previously read in the stack.

(03): This reads characters other than the Korean alphabet characters inputted from the font memory 8 and outputs them to the display 10 via the I/O interface 9.

(04): This assembles a Korean character from the Korean alphabet characters in the stack, selects a corresponding font from the font memory 8, provides it to the display 10 via the I/O interface 9, and outputs in succession characters other than the Korean alphabet characters previously inputted to the display 10 via the I/O interface 9.

Figure 4:
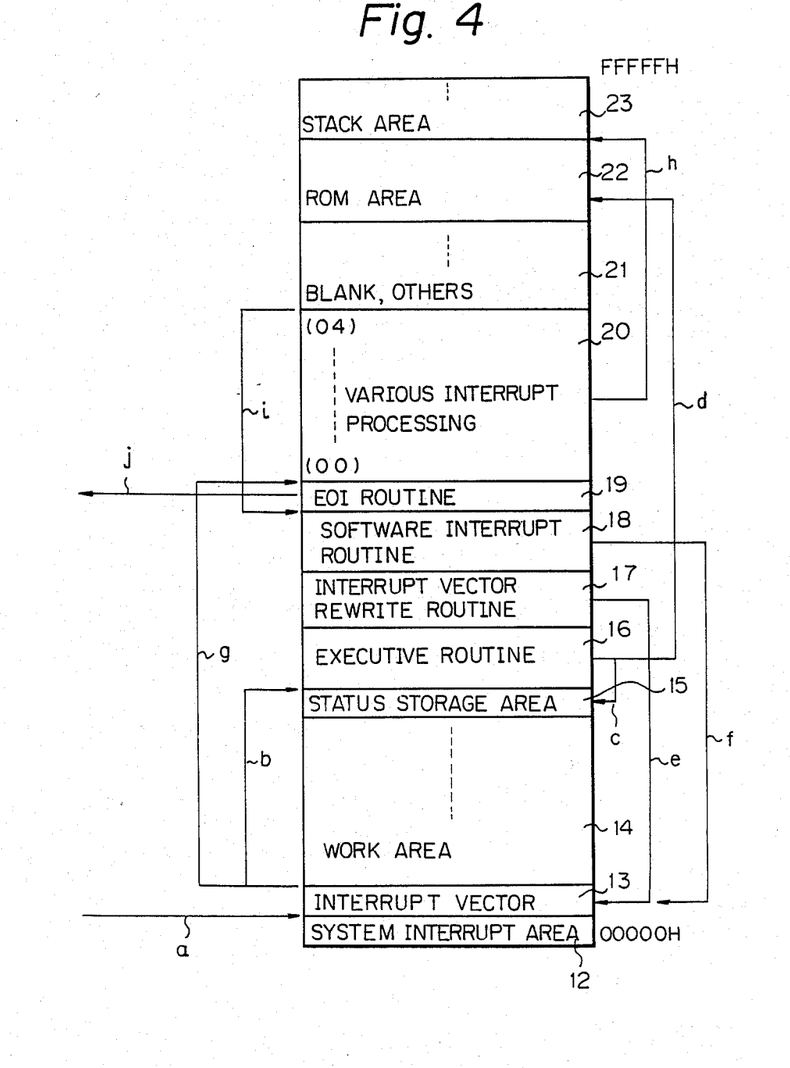
FIG. 4 is a memory map controlled by the microprocessor of the system shown in FIG. 1.

The following is a description of how the judgement and interrupt processings are executed by the respective hardware and software as well as the orders thereof with reference to the memory map of FIG. 4.

FIG. 4 is a view illustrating a directly accessible 1 MB memory space of the CPU 5 (i8086) wherein the arrows on the left of the same figure indicate the execution orders of the program associated with the present invention while the right arrows chiefly indicate reference destinations (access destinations) from the interior of the program.

First, the CPU 5 (i8086) has usually executed another control program stored in the work area 14 or the free area 21, etc., as well as logical operations.

When there is any key input, the interrupt controller 3 (i8259A) sets, as described before, the interrupt vector 13 to an interrupt register in the CPU 5 so as to permit the CPU 5 to change its execution and control object ot a vector selected from among 1KB interrupt vectors located from the address 0 to the address 3FF of the main memory 6.

The CPU 5 refers to the interrupt vector 13 as shown by the arrow (a) of FIG. 4, and thereby executes the executive routine 16 located at an execution address indicated by the interrupt vector 13 as shown by the arrow (b).

The executive routine 16 accesses the status storage area 15 as shown by the arrow (c), and executes the judgement processing (processing enclosed by ◇ ) shown in the status transition table (table 2) depending on the contents of the accessed area. Thereupon, the executive routine 16 accesses if necessary, the ROM area 22 in which the tables 3, 4, and 5 are stored as shown by the arrow (d) to check that any combination of the Korean alphabet characters is possible. Hereupon, the ROM area 22 is shown by the table memory 7 in the hardware of FIG. 1.

In addition, the executive routine 16 again accesses the status storage area 15 as shown by the arrow (c) to write a new status to be changed as listed in the status transition table (table 2) in the status storage area 15. The CPU 5 then executes the interrupt vector rewrite routine 17 for the purpose of the needed interrupt processings listed in the status transition table (table 2). The interrupt vector rewrite routine 17 accesses the interrupt vector 13 as shown by the arrow (e) for informing the CPU 5 of an address where interrupt processing found by the executive routine 16 to be necessary exists and writes the interrupt processing execution address. By holding in such a manner an interrupt vector in common for the hardware and software interrupts, the operation can be performed without requiring many interrupt vectors, i.e., with only one interrupt vector, except for the system interruption area 12, whereby resources can be cut down.

The CPU 5 executes the software interrupt routine 18. The software interrupt routine 18 refers to the interrupt vector 13 as shown by the arrow (f) and thereby informs the CPU 5 of execution addresses for the interrupt processings 20 of various types shown by the interrupt vector 13. The CPU 5 jumps the execution addresses as shown by the arrow (g) for executing any interrupt processing from (00) to (04) described above. Thereupon, the execution addresses from the processing (00) to the processing (04) are different from each other.

In these various interrupt processings 20, the stack area 23 is referred to at need as shown by the arrow (h) to output the stored Korean alphabet characters and to store Korean alphabet characters in the stack area anew.

The execution control of the CPU 5, upon finishing the various interrupt processings 20, advances to the software interrupt routine 18, and executes a prescribed interrupt end routine, EOI (End of Interrupt) routine 19, to inform the interrupt controller 3 of the end of the hardware interrupt, and thereafter returns to the original processing. The CPU 5 which has finished, for example the Korean character recognition continues the execution of the control for the original various control units and prescribed logical operations.

Successively, operation of the embodiment of the present invention will be described in detail with reference to Table 1 of FIG. 2 and Table 2 of FIG. 3.

It is here assumed as an example that a Korean alphabet row " 하ᅡㄴA " and alpha-numeric codes are inputted in succession from the keyboard 1.

First, the CPU 5 reads the Korean alphabet "ㅎ" from the buffer of the keyboard controller 2 using the executive routine 16 executed by the hardware interrupt and recognizes it to be a monocosonant, and furthermore recognizes the present status to be the initial status 0. In addition, the executive routine 16 writes in the status storage area 15, the vowel waiting status 1 to which it advances subsequently, and informs the interrupt vector rewrite routine 17 of the fact that the necessary interrupt processing is (00).

The interrupt vector rewrite routine 17 writes the execution address for the interrupt processing (00) in the interrupt vector 13, while the CPU 5 executes the interrupt processing (00) in conformity with the instruction of the software interrupt routine 18, i.e., stores the Korean alphabet character "ㅏ" on the stack area 23.

As described above, the first recognition processing by the hardware interrupt is finished, and the CPU 5 returns to the original processing and executes another job until the next key is depressed.

In succession, when a key of the Korean alphabet character "ㅏ" is depressed, the CPU 5 reads the Korean alphabet character "ㅏ", and the executive routine 16 refers to the status storage area 15 to recognize that the present status is the vowel waiting status 1 and that the Korean alphabet character "ㅏ" is a vertical vowel. Moreover, the executive routine 16 writes in the status storage area 15, the consonant waiting status 3 to which it is to advance successively, and informs the interrupt vector rewrite routine 17 of the fact that the necessary interrupt processing is (00). The Korean alphabet character "ㅏ" is stored in the stack area 23 as described above.

Then, when the key of the Korean alphabet character "ㄴ" is depressed, the CPU 5 reads the Korean alphabet character "ㄴ", while the executive routine 16 refers to the status storage area 15 to recognize that the present status is the consonant waiting status 3 and furthermore that "ㄴ" is a monoconsonant.

Figure 5:
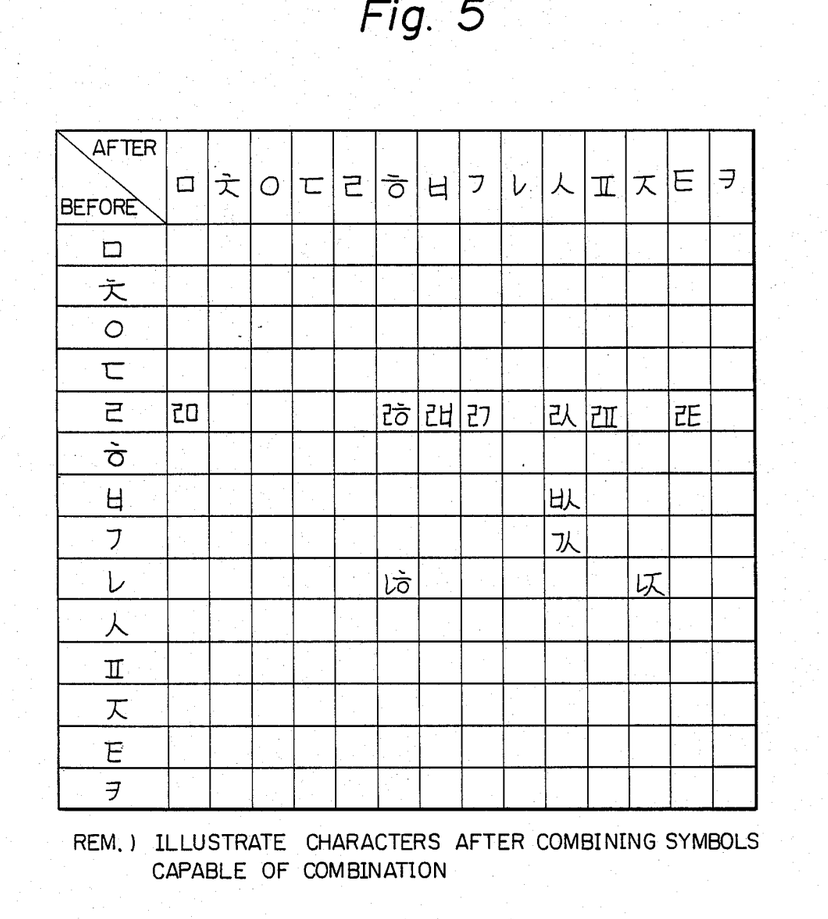
FIG. 5 is a consonant combination table (table 2) specifying the possible combination of consonants of the Korean alphabet.

Then, the executive routine 16 executes the judgement processing of ①. Namely, it determines whether or not any monoconsonant exists which is capable of combination with the monoconsonant "ㄴ" with reference to the table memory 7 which stores the monoconsonant combination table (table 3). In this case, since there are some consonants such as "ㅎㅈ" as shown in FIG. 5, it is found that the status to which the executive routine 16 is to advance is the consonant waiting status 4 and that the interrupt processing to be executed is (00).

Thus, the executive routine 16 writes in the status storage area 15, the monoconsonant waiting status 4 to which the operation is to advance successively, and informs the interrupt vector rewrite routine 17 of the fact that the necessary processing is (00). The Korean alphabet character "ㄴ" is then stored in the stack area 23 as in the above description.

In succession, when the key of the alphanumeric code "A" is depressed, the CPU 5 reads it, while the executive routine 16 refers to the status storage area 15 to recognize that the present status is the monoconsonant waiting status 4 and that "A" is a character other than a Korean alphabet character. Moreover, the executive routine 16 recognized that the status to which the operation is to advance is the initial status 0 and that the interrupt processing to be done is (04), writes the initial status 0 in the status storage area 15, and informs the interrupt vector rewrite routine 17 of the fact that the necessary interrupt processing is (04).

The interrupt vector rewrite routine 17 writes the execution address of the interrupt processing (04) in the interrupt vector 13, while the CPU 5 executes the interrupt processing (04) in conformity with the instruction of the software interrupt routine 18. Namely, it assembles the Korean alphabet characters "ㅎ", "ㅏ", and "ㄴ" stored until then in the stack area 23 in the Korean character "한", and selects a proper font from the font memory 8 to output it to the display 10 via the I/O interface 9, and furthermore selects a font of the inputted "A" from the font memory 8 to output it to the display 10 via the I/O interface 9 likewise the above description.

Thereupon, for the algorithm for use in assembling a Korean character from proper Korean alphabet characters of a necessary and sufficient number, a prior technique disclosed for example, in Park's patent may be employed.

Thus, the Korean character "한" and the alphanumeric code "A" are displayed on the display 10.

As described above, the important features of the present invention are to simplify the Korean character recognition method by classifying a Korean character into four types; monoconsonants, double consonants, horizontal vowels, and vertical vowels, combining consonants and vowels depending on respective input status to judge whether the final consonant can be arranged, and furthermore monitoring the assembled status of the Korean symbols.

In addition, with the self-recognition method simplified as such, the respective processings are, also upon realizing the algorithm therefor on the computer software, advantageously miniaturized and configured.

Furthermore, as shown in the embodiment of the present invention, according to the method and apparatus of the present invention, the CPU can recognize respective Korean alphabet characters in a Korean alphabet row serially inputted using of the interrupt processing, thereby improving the throughout of the CPU, and hence thereby improving the performance of the whole system using the CPU.

What is claimed is:

1. A method of recognizing a Korean character to be assembled from a Korean alphabet row inputted, comprising the steps of:
   (a) judging whether the inputted Korean alphabet row is monoconsonants or double consonants among consonants, and whether or not said inputted Korean alphabet row is horizontal vowels or vertical vowels among vowels;
   (b) reading an assembled status of the Korean alphabet rows previously inputted and stored from a prescribed location of a main memory, for analyzing said assembled status;
   (c) judging in response to said assembled status and the types of the inputted Korean alphabets whether or not the combination of the consonants is possible, whether or not the combination of the horizontal vowels and the vertical vowels is possible, an whether or not any double consonant can be arranged as the final consonant;
   (d) storing an assembled status to which a processing will be advanced subsequently at said prescribed location of the main memory in response to the result of said judgement processing, said assembled status, and the types of the inputted Korean alphabets; and
   (e) storing at least the inputted Korean alphabets or assembling the Korean alphabets previously stored into a Korean character in response to the result of said judgement processing, said stored assembled status, and the types of the inputted Korean alphabets.

2. An apparatus for recognizing a Korean character to be assembled from an inputted Korean alphabet row, said apparatus including at least a microprocessor executing a plurality of jobs in a time sharing manner, comprising:
   (a) a keyboard means for serially inputting a Korean alphabet row and generating a first interrupt request signal every time any Korean alphabet row is inputted;
   (b) an interrupt control means for generating a second interrupt request signal in response to said first interrupt request signal to trigger a change of the executing job in said microprocessor, said interrupt control means generating interrupt vector address information in response to an interrupt authorization signal;

(c) main memory means including at least a prescribed program, work area, status storage area, and interrupt vector area;

(d) a table memory for storing a monoconsonant combination table for judging whether or not any combination of monoconsonants is possible, a vowel combination table for judging whether or not any combination of horizontal vowels and vertical vowels is possible, and a double consonant attribute table for judging whether or not the double consonant can be arranged as the final consonant; and (e) a microprocessor for generating said interrupt authorization signal in response to said second interrupt request signal and executing the prescribed program on said main memory in conformity with said interrupt vector address information generated in the time sharing manner, whereby said apparatus judging whether Korean alphabets inputted successively are monoconsonants or double consonants among consonants and judging whether they are horizontal vowels or vertical vowels among vowels, said apparatus reading the assembled status of Korean alphabets inputted and stored previously from said status storage area and analyzing the status for judging with use of said table memory whether or not any combination of the monoconsonants is possible, wwhether or not any combination of the horizontal vowels and the vertical vowels is possible, and whether or not the double consonant can be arranged as the final consonant in response to said assembled status, and the types of the inputted Korean alphabets, said apparatus storing on said status storage area, a status to which a processing will be advanced subsequently in response to result of said judgement processing, said assembled status, and the types of the inputted Korean alphabets, sand said apparatus storing at least the inputted Korean alphabets in the main memory in response to the result of said judgement processing, said assembled status, and the types of the inputted Korean alphabets or assembling the Korean alphabets previously stored into a Korean character.

* * * * *